United States Patent Office 3,496,226
Patented Feb. 17, 1970

3,496,226
PROCESS FOR THE PURIFICATION OF
OLEFIN-SULFONATES
Erich Schuierer, Munich-Obermenzing, Germany,
 assignor to Farbwerke Hoechst Aktiengesellschaft
 vormals Meister Lucius & Bruning, Frankfurt am
 Main, Germany, a corporation of Germany
No Drawing. Filed Nov. 22, 1968, Ser. No. 778,295
Claims priority, application Germany, Dec. 1, 1967,
1,668,048
Int. Cl. C11d 11/14
U.S. Cl. 260—513                               2 Claims

ABSTRACT OF THE DISCLOSURE

Sodium-olefin-sulfonates, obtained by sulfonation of straight-chain olefins of 12 to 24 carbon atoms with sulfur trioxide in the absence of a solvent and subsequent hydrolysis with an excess of sodium hydride solution, can be purified by extracting them with aliphatic alcohols containing from 3 to 10 carbon atoms. The pure sulfonates remain as residue in a yield of 60 to 80%. A further 10 to 30% of pure sulfonate can be obtained by crystallization from the extraction liquor, while the impurities remain as oily substances when distilling off the solvent.

The object of the present invention is a process for the purification of olefin-sulfonates which are obtained directly in the sulfonation of straight-chain olefins of 12 to 24 carbon atoms with sulfur trioxide, wherein the crude products which are obtained in this sulfonation are neutralized with sodium hydroxide solution, are extracted with alcohols containing 3 to 10 carbon atoms.

Long chain olefin-sulfonates obtained by the hydrolysis of sulfonated olefins are used as wash-active compounds. They have the advantage over other detergents, that they are easily degradable biologically and that the α-olefins used as basic substances for their preparation are not expensive.

The sulfonation of straight chain α-olefins with sulfur trioxide (I. E. Woodbridge, Journal of the American Oil Chemist's Society, October 1958, page 528 et seq. and Industrial Engineering Chemistry 41, 1923 (1949)) can be carried out in solvents, for example in liquid sulfur dioxide, phosphorus trichloride and chlorinated hydrocarbons, but also without using solvents. The disadvantage of the direct reaction, wherein the olefins are treated with gaseous sulfur trioxide at temperatures in the range of from 70 to 90° C. and the resulting products are taken up in excess sodium hydroxide solution, whereby hydrolysis and neutralisation take place, resides in the fact that strongly coloured products are formed which require subsequent purification. The olefin-sulfonate solutions obtained in this manner may, for example, be bleached with ozone and hydrogen peroxide in the alkaline range and concentrated by evaporation on a drying roller. But even these bleached products still show a slightly yellow colour which makes the unsuitable for special purposes, for example as additives to tooth pastes. The sulfonation in the presence of solvents, on the other hand, yields products with a better quality, but this method involves solvent losses which are due to such side reactions as, for example that occurring when phosphorus trichloride is used as solvent and corresponds to the reaction scheme

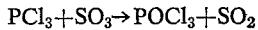

and which also occur during recovery of the solvents. For economical reasons, therefore, it should be endeavoured to carry out the reaction directly while simultaneously improving the quality of the products. Attempts to remove the impurities from the aqueous solutions by extraction with organic solvents, for example chlorinated and unchlorinated hydrocarbons, ethers, or higher alcohols, have failed owing to the fact that the impurities are far more soluble in water than in the solvents. Solid adsorbents such as active charcoal, bleaching earth, and the like, also have failed. Crystallization of the products from aqueous solutions failed too, because of the heterogenous composition of the products. The reaction product of hexadecene, for example is composed of about 50% of sodium-hexadecene-sulfonate, 45–47% of sodium-hexadecene-disulfonated and 2–5% of sodium sulfate. On the other hand, the solubility of the solid sodium-olefin-sulfonates in cheap conventional solvents, for example chlorinated and unchlorinated hydrocarbons, ethers, acetone, dimethylformamide, dimethyl-sulfoxide, methanol or ethanol, is so low that a purification by recrystallization is not practicable.

We have now found that, surprisingly, a purification of the olefin-sulfonates, that have been obtained by direct reaction and that have been bleached, is possible when treating the finely pulverized dry product, for example in an extraction apparatus, for some hours up to several days, with aliphatic alcohols, especially with alkanols, containing 3 to 10 carbon atoms, in particular with n-butanol, at a 5- to 30-fold excess, preferably a 8- to 25-fold excess with reference to the weight of the olefin-sulfonates.

During the extraction, the impurities are practically dissolved, whereas the olefin-sulfonates remain behind undissolved. If, for example, the extraction is effected with n-butanol in a Soxhlet-apparatus, 60 to 80% of colourless olefin-sulfonate remain behind in the cylinder. This part of the product contains the totality of sodium sulfate. Further 10 to 30% of olefin-sulfonate can be recovered as a white crystalline precipitate from the butanol solution. The residue corresponds to the impurities which remain behind as an oily product upon evaporation of the solvent. After drying, the white olefin-sulfonate obtained by the extraction may still contain traces of solvent which may disturb during the further treatment. These traces may be removed by several washings with methanol or ethanol and following drying at 60 to 150° C.

Mixtures of the mentioned alcohols containing 3 to 10 carbon atoms may also be used.

The effect produced by such a purification was not expected since other polar solvents such as methanol, ethanol, acetone, ethyl acetate and acetonitrile have failed.

The following examples illustrate the invention but they are not intended to limit it thereto:

EXAMPLE 1

500 g. of dry crude sodium-hexadecene-sulfonate (consisting of about 50% of sodium-hexadecene-sulfonate, 47% of sodium-hexadecene-disulfonate and 3% of sodium sulfate) were treated for 48 hours in a Soxhlet-apparatus with 4 kg. of n-butanol. 65% remained in undissolved form, while 26% of the batch were recovered from the solution by crystallization. Both products were then washed with methanol and dried at 110° C. They were absolutely odourless and colourless. Analysis showed that the undissolved product consisted of 49% of sodium-hexadecene-sulfonate, 46.4% of sodium-hexadecene-disulfonate and 4.6% of sodium sulfate and that the product obtained from the solution by crystallization consisted of 51% of sodium-hexadecene-sulfonate and 49% of sodium-hexadecene-disulfonate. After evaporation of the mother liquor, 9% of the quantity initially used remained behind in form of a brown oil.

EXAMPLE 2

500 g. of dry sodium-hexadecene-sulfonate were treated in the manner described in Example 1 with 5 kg. of isopropanol. 55% remained behind in undissolved form, while 36% of the quantity initially used could be recovered by crystallization.

EXAMPLE 3

500 g. of dry sodium-hexadecene-sulfonate were extracted in the manner described in Example 1 with 6 kg. of amyl alcohol. 73% remained behind and 17% of the batch were obtained by crystallization.

EXAMPLE 4

500 g. of dry coloured sodium-hexadecene-sulfonate were stirred for 3 days, under reflux, with the 25-fold quantity by weight of a mixture of equal parts of n-propanol, n-butanol and decyl-alcohol. After cooling, 87% of undissolved white olefin-sulfonate containing 3.5% of sodium sulfate were filtered off, washed with methanol and dried for 2 days at 150° C.

EXAMPLE 5

500 g. of crude dry sodium-olefin-sulfonate, consisting of 54% of sodium-olefin-sulfonate (chain distribution: 2% $C_{17}$, 22% $C_{18}$, 39% $C_{19}$, 32% $C_{20}$ and 5% $C_{21}$), 38.2% of sodium-olefin-disulfonate (with a chain distribution as given above) and 7.8% of sodium sulfate, were treated for 48 hours in a Soxhlet-apparatus with 4 kg. of n-butanol. 66% of the batch consisting of 52% of sodium-olefin-sulfonate (chain distribution as above), 36.2% of sodium-olefin-disulfonate (chain distribution as above) and 11.8% of sodium sulfate remained behind in undissolved form; further 26% which consisted of 52% of sodium-olefin-sulfonate (chain distribution as above) and 48% of sodium olefin-disulfonate (chain distribution as above), could be recovered from the solution by crystallization. The further treatment was effected as described in Example 1.

I claim:

1. Process for the purification of sodium-olefin-sufonates obtained by sulfonation of straight-chain olefins of 12 to 24 carbon atoms with sulfur trioxide in the absence of a solvent and subsequent hydrolysis with sodium hydroxide, which comprises extracting the sulfonates with an alkanol of 3 to 10 carbon atoms or with a mixture thereof.

2. The process as claimed in claim 1, wherein the extraction is effected with n-butanol.

References Cited

UNITED STATES PATENTS 3,444,087    5/1969    Eccles et al.

DANIEL D. HORWITZ, Primary Examiner